United States Patent [19]

Hara et al.

[11] Patent Number: 4,900,799
[45] Date of Patent: Feb. 13, 1990

[54] METATHESIS POLYMERIZATION OF CYCLOOLEFINS

[75] Inventors: Shigeyoshi Hara; Zen-ichiro Endo, both of Iwakuni, Japan

[73] Assignee: Teijin Limited, Osaka, Japan

[21] Appl. No.: 65,738

[22] Filed: Jun. 24, 1987

[30] Foreign Application Priority Data

Jun. 24, 1986 [JP] Japan ............................ 61-146254
Jul. 31, 1986 [JP] Japan ............................ 61-178884
Aug. 6, 1986 [JP] Japan ............................ 61-183468

[51] Int. Cl.⁴ .................... C08F 4/78; C08F 36/20
[52] U.S. Cl. .................... 526/282; 526/281; 526/169; 526/188; 264/328.6
[58] Field of Search ............ 526/282, 281, 169, 188; 264/328.6, 328.2; 502/117; 585/22

[56] References Cited

U.S. PATENT DOCUMENTS

| | | | |
|---|---|---|---|
| 3,935,179 | 1/1976 | Ofstead et al. | 526/142 X |
| 4,380,617 | 4/1983 | Minchak et al. | 526/161 |
| 4,400,340 | 8/1983 | Klosiewicz | 526/283 X |
| 4,418,178 | 11/1983 | DeWitt | 525/97 |
| 4,418,179 | 11/1983 | DeWitt et al. | 525/249 |
| 4,426,502 | 1/1984 | Minchak | 526/172 |
| 4,426,506 | 1/1984 | Blanco | 526/302 |
| 4,436,858 | 3/1984 | Klosiewicz | 524/296 |
| 4,458,037 | 7/1984 | Leach | 521/124 |
| 4,469,809 | 9/1984 | Klosiewicz | 502/117 |
| 4,481,344 | 11/1984 | Newburg | 526/283 |
| 4,485,208 | 11/1984 | Klosiewicz | 526/169 X |
| 4,496,668 | 1/1985 | Newburg | 521/91 |
| 4,496,669 | 1/1985 | Leach | 521/93 |
| 4,507,453 | 3/1985 | Tom | 526/283 |
| 4,520,181 | 5/1985 | Klosiewicz | 525/247 |
| 4,535,097 | 8/1985 | Newburg | 521/139 |
| 4,598,102 | 7/1986 | Leach | 521/93 |
| 4,604,408 | 8/1986 | Newburg | 521/91 |
| 4,604,447 | 8/1986 | Malpass, Jr. | 526/189 |
| 4,607,077 | 8/1986 | Silver et al. | 524/708 |
| 4,657,881 | 4/1987 | Crampton et al. | 502/80 |
| 4,661,575 | 4/1987 | Tom | 526/283 |

FOREIGN PATENT DOCUMENTS

| | | | |
|---|---|---|---|
| 181640 | 5/1986 | European Pat. Off. | 526/281 |
| 24400 | 3/1978 | Japan | 526/283 |

OTHER PUBLICATIONS

Translation of Japanese Pat. Laid-Open No. 53-24400, published 3/7/78.

Primary Examiner—Joseph L. Schofer
Assistant Examiner—F. M. Teskin
Attorney, Agent, or Firm—Sughrue, Mion, Zinn, Macpeak & Seas

[57] ABSTRACT

A polymer prepared by metathesis polymerizing at least one compound represented by the formula

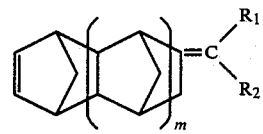

wherein m is 0 or 1 and $R_1$ and $R_2$ respectively represent hydrogen atom or an alkyl group containing up to three carbon atoms provided that both $R_1$ and $R_2$ are not hydrogen atom at the same time, or a mixture of said compound with at least one other metathesis polymerizable comonomer, a useful molded article, processes for preparing the polymer and a polymerizable composition therefor.

87 Claims, 2 Drawing Sheets

METATHESIS POLYMERIZATION OF CYCLOOLEFINS

FIELD OF THE INVENTION

This invention relates to a metathesis polymerization of cycloolefins, new polymers prepared therefrom, molded articles prepared from the polymers and polymerizable compositions for preparing the polymers.

BACKGROUND OF THE INVENTION

It is known that ring-opening polymerization of a cycloolefin containing norbornene moiety, e.g. dicyclopentadiene (called "DCP" hereinafter) in the presence of a metathesis polymerization catalyst system produces a cross-linked polymer containing olefinic groups on the main chain (e.g. Japanese Patent Laid Open Sho 58-129013). In such known technique, there are easily obtained large-sized molded articles of the cross-linked polymers by reaction molding process from DCP. The molded articles have been taken notice from the industrial point of view since they have attractive physical properties as balanced in stiffness and impact resistance. On the other hand, some of 5-alkylidenebicyclo[2.2.1]hept-2-enes (called "ABH" hereinbelow) by the formula

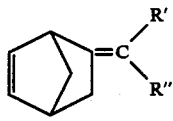

wherein R' and R" independently represent hydrogen atom or a lower alkyl group, both R' and R" not being hydrogen at the same time, are available. For example, 5-ethylidenebicyclo[2.2.1]hept-2-ene (called "ENB" hereinbelow) among them, is obtained by isomerization of 5-vinylcyclo[2.2.1]hept-2-ene (called "VBH" hereinbelow) which is a Diels-Alder adduct of cyclopentadiene and butadiene. ENB is advantageously used as the third component for ethylenepropylene-diene rubber and is commercially available in such a purity as can be applied to ionic polymerization.

Further, Diels-Alder addition of cyclopentadiene to the above-mentioned ABH yields a corresponding 6-alkylidene-1,4,5,8-dimethano-1,4,4a,5,7,8,8a-heptahydronaphthalene (called "ADHN" hereinbelow) of the formula

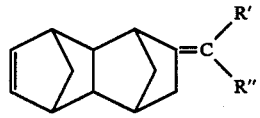

wherein R' and R" are as defined above.

As obvious from the above-mentioned chemical formulas, ABH and ADHN both have one acyclic olefinic group in addition to the cyclic olefinic group.

It is also known that the acyclic olefin, when added to the metathesis polymerization system of a cyclic olefin, participates in the reaction and acts as a chainterminator or a chain-transfer agent.

Therefore, it would be duly considered that when ABH and ADHN would be used in metathesis polymerization, said acyclic olefinic group present should act as a chain-terminator in the metathesis polymerization to form rather low-molecular-weight cross-linked metathesis polymers, and volatile by-products.

In fact, it was reported that 5-methylidenbicyclo[2.2.1]hept-2-ene (called "MBH" hereinafter), corresponding to the case of R'=R"=H in the general formula above, had yielded a mostly cross-linked polymer in the presence of the metathesis catalysts [Paul R. Hein J. Polymer Sci., Polym. Chem. 11, 167(1973)]. Analogously, as mentioned in the Comparative Examples 2–3 later, we have tested the metathesis homopolymerization of VBH and MBH respectively, both resulting in a soft, fragile, insoluble polymer containing many irregular voids. This is a clear evidence of the involvement of the pendant acyclic olefinic group in the metathesis reaction as a chain-terminating or chain-transfer group.

In contrast, we have found that ENB, a typical example of ABH, yields a rigid, tough, soluble polymer having substantially no void in the metathesis polymerization. This different behavior of ENB in the metathesis polymerization from VBH and MBH is quite unexpected, since the structures of the three are very analogous. The difference between ENB and VBH lies only in the position of the acyclic olefinic bond, while the difference between ENB and MBH is that the former has a methyl substitute to the methylidene group of MBH. In summation, both MBH and VBH have an α-olefinic group as a pendant acyclic group, but ENB has an inner olefinic group substituted with three hydrocarbon groups. Therefore, said different behavior of ENB in the metathesis polymerization can be explained only by substantially no participation of the substituted olefinic group of ENB in the metathesis polymerization due to steric hindrance.

We have also found that a typical ADHN, 6-ethylidene-1,4,5,8-dimethano-1,4,4a,5,7,8,8a-heptahydronaphthalene (called "EDHN" hereinafter), which is the Diels-Alder adducts of ENB with cyclopentadiene, shows similar behaviors to that of ENB. In addition, we have found that such ABH and ADHN as ENB and EDHN can be applied to reaction molding method to form molded articles of attractive properties and that especially when they are used with other metathesis-polymerizable monomers, e.g. DCP, much improvement as mentioned in details later can be achieved to the reaction molding process and molded articles therefrom.

Now, we have found that, when ABH and/or ADHN is used as at least a part of monomers for the metathesis polymerization, the acyclic pendant olefinic group of ABH or ADHN, which is substituted by at least three hydrocarbon groups, hardly participate in the metathesis polymerization and does not do any harm, and thus, the ring-opening polymerization of the norbornene-type cyclic olefin predominantly occurs to produce a tough high-molecular weight polymer having pendant acyclic olefinic groups.

We have also found that ABH and/or ADHN can be advantageously applied to the reaction molding process as at least a part of monomers with such metathesis polymerization monomers as DCP.

Therefore, it is an object of the present invention to provide new polymers by metathesis polymerization of ABH or ADHN. A further object is to provide useful molded articles from said polymers. Another object of the invention is to provide processes for preparing said new polymers and said useful molded articles. A further object is to provide polymerizable compositions therefor.

SUMMARY OF THE INVENTION

The present invention relates to a new polymer which comprises at least one repeating unit having the formula selected from

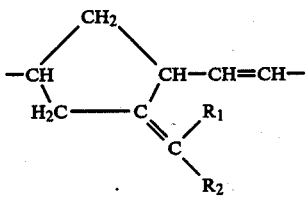
(I)

and

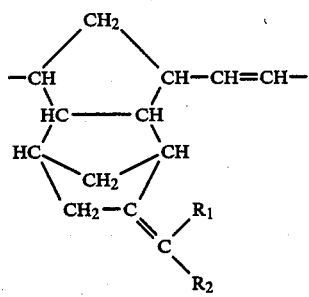
(II)

wherein $R_1$ and $R_2$ respectively represent a hydrogen atom or an alkyl group containing up to three carbon atoms, provided that both $R_1$ and $R_2$ are not hydrogen atoms and at least one different repeating unit derived from one or more metathesis polymerizable comonomers and molded articles formed from said polymers.

Furthermore, the invention relates to a process for preparing the above-mentioned new polymers by polymerizing at least one compound having the formula (III)

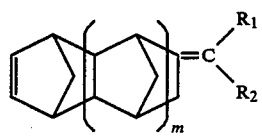
(III)

wherein m is 0 or 1 and $R_1$ and $R_2$ respectively represent the same groups as defined above or a mixture of said compound with at least one other metathesis polymerizable comonomer in the presence of a metathesis polymerization catalyst system.

In addition, the invention provides a process for preparing molded articles by mixing at least two of a first reactive solution containing the catalyst of the metathesis polymerization catalyst system and a cycloolefin and a second reactive solution containing the activator of the metathesis polymerization catalyst system and a cycloolefin and subsequently pouring the mixture into a mold in which polymerization occurs to produce a molded article, wherein the improvement comprises using, as said cycloolefin, at least one compound of the formula (III)

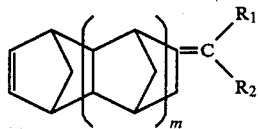
(III)

wherein m is 0 or 1 and $R_1$ and $R_2$ respectively represent the same group as defined above or a mixture of said compound with at least one other metathesis polymerizable comonomer.

The invention further provides multi-part polymerizable compositions containing at least one compound of the formula (III)

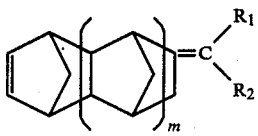
(III)

wherein m is 0 and 1 and $R_1$ and $R_2$ respectively represent the same group as defined above or a mixture of said compound with at least one other metathesis polymerizable comonomer and a metathesis polymerization catalyst system comprising a catalyst and an activator, said catalyst and said activator not being present in the same part.

When m is 0 in the above-mentioned general formula (III), said compound corresponds to ABH, which provides the repeating unit of the above-mentioned formula (I). When m is 1, said compound corresponds to ADHN, which provides the repeating unit the formula (II).

Figure 1:
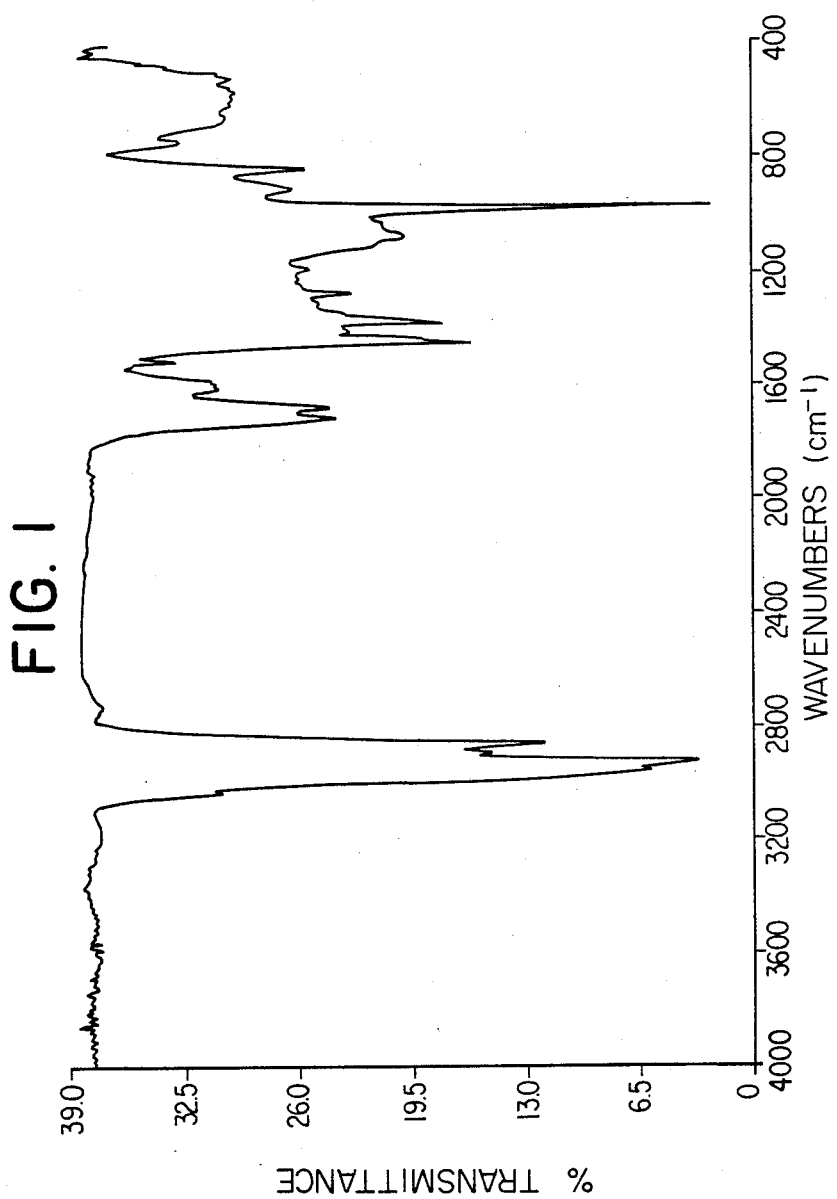
FIG. 1 shows the infrared absorption spectrum of an ENB homopolymer.

Of the compounds having the above-mentioned formula (III), ABH is represented by the formula (IIIa)

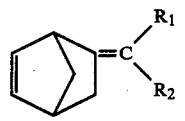
(IIIa)

wherein $R_1$ and $R_2$ respectively represent the same groups as defined above. It is particularly preferable that both $R_1$ and $R_2$ are methyl groups or any one of $R_1$ and $R_2$ is a methyl group and the other is a hydrogen atom. That is, 5-isopropylidenebicyclo[2.2.1]hept-2-ene (called "PNB" hereinbelow) and 5-ethylidenebicyclo[2.2.1]hept-2-ene (ENB) are preferable, and the latter is more preferable.

ADHN is represented by the formula (IIIb)

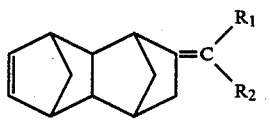
(IIIb)

wherein R₁ and R₂ respectively represent the same group as defined above.

It is particularly preferable that both R₁ and R₂ are methyl groups or any one of R₁ and R₂ is a methyl group and the other is a hydrogen atom.

Namely, 6-isopropylidene-1,4,5,8-dimethano-1,4,4a,5,7,8,8a-heptahydronaphtalene (called "PDHN" hereinbelow) and 6-ethylidene-1,4,5,8-dimethano-1,4,4a,5,7,8,8a-heptahydronaphthalene (EDHN) are preferable, and the latter is more preferable.

It is preferred that ABH and ADHN used in the invention are of a high purity of 95% or higher, and more preferably of 97% or higher. Whereas the impurities should, of course, be those which do not inhibit activity of the metathesis catalyst system, they should preferably be metathesis polymerizable. It is preferable that the content of polar compounds which inhibit metathesis polymerization, e.g. as alcohols, carboxylic acids and carbonyl compounds, is as low as possible.

In the present invention, at least one other metathesis polymerizable comonomer may be used for copolymerization in any proportion with ABH and ADHN. Especially, those which are equally metathesis polymerizable to ABH and ADHN may be used.

From the aspect of metathesis polymerizability, cycloalkenes except cyclohexene may be used, such as cyclobutene, cyclopentene, cycloheptene, cyclooctene and substituted derivatives thereof. Compounds which contain in the molecule at least one norbornene structure of the formula (IV)

(IV)

wherein valencies represented by a dotted line may be bonded mutually via another atom to form a further cyclic structure are preferred, since they have the similar metathesis polymerizability to ABH and ADHN.

Preferred examples of the comonomers may include those which are metathesis polymerizable by-products and/or starting materials remaining unreacted during the process of preparing ABH or ADHN. Especially, the use of such by-products and remaining materials as a comonomer is advantageous when they are difficult to remove from ABH or ADHN, and/or when they can provide the resultant polymers with some improved properties.

Examples of such comonomers in the case of EDHN, a typical, most preferred example of ADHN, can include ENB, DCP, tricyclopentadiene, oligocyclopentadienes having more than three cyclopentadiene moieties, and such a compound as is represented by the formula

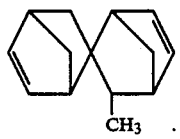

ENB is a starting material. DCP is also a starting material when DCP is used as a cyclopentadiene source, while it should be regarded as a by-product when cyclopentadiene itself is used as a starting material. All the others mentioned above are by-products.

The above compounds are all metathesis polymerizable similarly to EDHN. The use of such comonomers is especially advantageous when EDHN is applied to the reaction molding process. In case of ENB, VBH and DCP can be regarded as such comonomers as mentioned above.

As described before, vinyl group of VBH will do harm during the metathesis polymerization. But, when the content of VBH is so small as, for example, up to 5–10%, polymers of satisfactory performance can result.

Preferred examples of the comonomers that provide the polymer of the invention with improved properties are those which contain two or more metathesis polymerizable groups such as norbornene structure and sterically distorted cyclopentene ring per molecule to effectively increase the degree of cross-linking in the polymer product (A), those which contain at least one polar group of organic Lewis base to enable to control the rate of metathesis polymerization or to enable to introduce a polar group into the molecular chain thereby increasing resistance to chemicals and heat (B).

Examples of the aforesaid (A) may include dicyclopentadiene, oligocyclopentadiene having at least three cyclopentadiene moieties, 1,4,5,8-dimethano-1,4,4a,5,8,8a-hexahydronaphthalene, tri-cyclo[2.2.1.0]trideca-5,11-diene and the like.

Examples of the polar groups of the Lewis base (B) may include cyano group, carboxylic ester groups, ether groups and tertiary amine and/or amide groups such as pyridine.

Examples of the Lewis base (B) include 5-cyanonorbornene, 5,6-dicyanonorbornene, 6-cyano,1,4,5,8-dimethano-1,4,4a,5,6,7,8,8a-octahydronaphthalene, 5-methoxycarbonylnorbornene, 5-methyl-5-methoxycarbonylnobornene, 5-butoxynorbornene, 5-phenoxymethyl norbornene, 5-acetyloxynorbornene, 5-methylbutoxycarbonylnorbornene, nadic acid dimethylester, 5-norbornenylcarboxylic, 5-(4-pyridyl)norbornene and the like.

Moreover, norbornene derivatives which have one metathesis polymerizable group may include 5-butylnorbornene, 5-isopropenylnorbornene, 5-phenylnorbornene, cyclopentadienemethylcyclopentadiene codimer, 1,4,5,8-dimethano-1,4,4a,5,6,7,8,8a-octahydronaphthalene and the like.

Among the comonomers set forth above are preferred dicyclopentadiene, oligocyclopentadienes which have more than 2 cyclopentadiene moieties per molecule such as tricyclopentadiene, 5-cyanonorbornene, 5-phenylnorbornene, 5-alkoxycarbonylnorbornenes, 5-methyl-alkoxycarbonylnorbornenes, 5-pyridylnorbornene and the like.

Such comonomer component is used in the range between 0 and 99 molar percent particularly 0–95 molar percent with ABH and ADHN.

It is identified by infrared absorption spectrum and other means that the new polymers of the invention produced by metathesis polymerization of a compound of by the above formula (III) or of a mixture of said compound and another metathesis polymerizable comonomer consist substantially of a repeating unit having the formula (I)

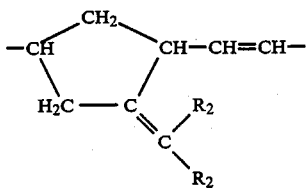

(I)

wherein $R_1$ and $R_2$ respectively represent the same group as defined above and/or a repeating unit having the formula (II)

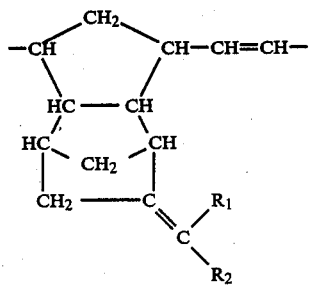

(II)

wherein $R_1$ and $R_2$ respectively represent the same group as defined above, or comprise the repeating unit having the formula (I) and/or (II) and repeating unit derived from another metathesis polymerizable comonomer. Since the polymer of the invention has acyclic olefinic groups which are post-reactive, it is also possible to improve properties such as softening point by post-cure, etc. Moreover, the presence of said acyclic olefinic groups enables additional chemical treatments in the polymer and polymer molded articles.

Especially, the metathesis polymers of the invention based upon ADHN have a very high $T_g$ as compared with known metathesis polymerized polymers such as DCP metathesis polymerized polymer. EDHN homopolymer has $T_g$ of 160° C. or higher. Therefore, ADHN is very effective as a comonomer in respect of increasing $T_g$ of other metathesis polymerized polymers. ADHN can be effective even when used in a proportion as low as 5 mole %. Therefore, a wide range of proportions of ADHN can be effectively used with other co-monomers.

Consequently, it is preferable to use other comonomers in the range of 2–50 mole %, particularly 5–50 mole %, more preferably 5–45 mole %, in order to modify properties of the ADHN polymers.

On the other hand, when ADHN is used for increasing $T_g$ of other metathesis polymerized polymers such as DCP polymer, ADHN is copolymerized preferably in the range of 5–50 mole %, particularly 5–40 mole %, more preferably 10–40 mole % with other comonomers.

When ABH, particularly ENB, is copolymerized in a small portion (usually of 15 mole % or less) with other metathesis polymerizable comonomers, e.g. DCP, the amount of residual monomers is decreased and the softening point of the polymers increases, and so the heat resistance is improved.

Moreover, when ABH or ADHN is added in a small portion (usually of 10 mole % or lower) to a reactive solution comprising a cycloolefinic monomer of norbornene type such as dicyclopentadiene, the freezing point of said reactive solution can be lowered to avoid freezing at an ordinary temperature so that the handling of the reactive solution, e.g. mixing or injection into a mold, becomes more easy.

It is known that the metathesis catalyst system is so reactive and it reacts easily not only with oxygen or water but also with other polar components in the monomer and so loses the catalytic activity. Therefore, dicyclopentadiene, when used for polymerization in the presence of a metathesis catalyst system, is used in a especially high purity. The freezing point of dicyclopentadiene tends to exceed 33° C. with increased purity. The freezing point tends to decrease to some extent by dissolving catalyst components in the polymerizable reaction solution, but in general, is 20° C. or higher. Therefore, the reaction solution freezes at the usual room temperature. The metathesis catalyst system is very reactive and so the activity of them decreases in a shorter time when kept at a temperature of 30° C. or higher even when the catalyst and the activator of the catalyst system are added separately into two individual solutions. It is difficult to keep the polymerizable reaction solutions under heat in the form of liquid ready for use. However, the reaction solution should be in liquid state when used, therefore, it should be melted by heating prior to the use. Therefore, the polymerizable solutions should be warmed shortly before they are used in the polymerization reaction and thus it is very troublesome. To avoid the above disadvantages, it would be possible to add a component which does not inhibit the activity of the catalyst system and can decrease the freezing point of dicyclopentadiene. If, however, the component remains unpolymerized in the molded articles of the cross-linked polymer, it will bring various disadvantages such as deterioration of the properties of the molded articles.

In contrast, the present invention enables to decrease the freezing point of the polymerizable solutions and to provide easy handling of the polymerizable solution by adding ABH or ADHN into dicyclopentadiene. Also, ABH and ADHN are highly metathesis polymerizable as described above and copolymerizable with other metathesis polymerizable component such as dicyclopentadiene, and thus the resulting copolymer can be reduced the odor from the residual monomer. ENB is especially suitable to use for that purpose, since it is commercially available as mentioned previously.

As mentioned above, ABH and/or ADHN can be co-polymerized with 0–50 mol %, particularly 2–50 mole %, more preferably 5–45 mole % of said other metathesis polymerizable monomers to modify their polymer properties with keeping their own characteristics.

In addition, ABH and/or ADHN can be used as comonomers with other metathesis polymerizable monomers, such as DCP, in the range of 1–50 mol %.

To improve the heat-resistance and/or post-curability, copolymers containing 5–50 mol %, particularly 10–40 mol % of ABN and/or ADHN, especially ADHN, are preferred.

To lower the freezing point of the reaction solutions, the addition of 1–15 mol %, particularly 1–10 mol % of ABH and/or ADHN, especially ABH, as comonomers is preferred. DCP or DCP mixture with oligocyclopentadiene (mainly tricyclopentadiene) and/or cyclopentadiene-methylcyclopentadiene codimer is the most preferred metathesis polymerizable monomers.

The most preferred embodiments are the composition (i) which comprises 1–10 mol % of ENB, 99–80 mole % of DCP and 0–10 mol % of other metathesis polymerizable monomers such as mentioned before (most preferably tricyclopentadiene), and the composition (ii) which comprises 5–50 mol % of EDHN, 95–20 mol % of DCP and 0–40 mol % of other metathesis polymerizable monomers such as mentioned before (most preferably tricyclopentadiene).

In general, as well known, the metathesis polymerization catalyst system is composed of two components, a main catalyst component and an activator component. When the metathesis polymerization of ABH or ADHN is carried out under such mild conditions as the solution-polymerization in an inert solvent, a polymer which is soluble and melt-processable, (that means it is substantially linear), can be obtained, since the acyclic olefinic group in ABH or ADHN is not substantially involved in the metathesis reaction as mentioned before.

But the processability, especially the meltprocessability, is not good due to the susceptability of the oxidation coupling and/or the polymerization of the remaining olefinic bonds in the metathesis polymers, which are readily gelled upon heating.

Therefore, it is advantageous to carry out the polymerization in bulk by pouring the liquid monomer into a mold and polymerizing it there to produce a polymer molded article in one-shot.

Such bulk polymerization may be carried out by a method in which an activator component is first added to a monomer and then a principal catalyst component is added to initiate polymerization and finally the mixture is molded before solidified to produce a cross-linked molded articles, or also by a method in which a principal catalyst component and an activator component are simultaneously added to a monomer mixture and molded articles are prepared in the same manner as the above.

The metathesis polymerization reaction, however, is an exothermal reaction and proceeds very rapidly, and thus the polymerization often occurs before poured into a mold and it makes the pouring of the solution into the mold difficult.

Accordingly, it is desirable to apply a method in which the original reactive solutions to be poured into a mold are separated into multi-part reactive solutions, that is, the catalyst and the activator of the metathesis polymerization catalyst system are added to individual monomer liquids to form multi-part reactive solution, and then the multi-part reaction solutions are mixed rapidly by means of impinging-mixing (the RIM process) or using a static mixer immediately poured into a mold wherein it is polymerized and molded. In the bulk polymerization, the polymers prepared are apt to contain more or less cross-linked structure, since the temperature of the polymerization medium increases with the violent exothermal reaction and thus a portion of the side-chain double bonds may participate in the side-reaction. However, it was found that the presence of some extent of cross-linked structure would rather be favorable, since the molding has already finished and the cross-linked structure provides the molded articles with the increased resistance to chemicals and heat.

In this method, the monomers are included in at least one of the separate reactive solutions, one of which contains the catalyst component and another of which contains the activator component. The ratio of the monomers is not necessarily the same in the multi-part reactive solutions. The ratio of the monomers may be changed freely provided that the whole ratio of the monomers is kept within the above-mentioned range.

Japanese Patent Laid Open Sho 58-129013 discloses such molding process wherein multi-part polymerizable solutions containing dicyclopentadiene as the monomer are mixed and polymerized.

As the catalyst component of the metathesis polymerization catalyst system in the above-described molding method are used salts such as halides of tungsten, molybdenum, rhenium or tantalum. Particularly preferable are the tungsten compounds. As such tungsten compounds are preferred tungsten halides, tungsten oxyhalides and the like. More particularly, tungsten hexachloride, tungsten oxychloride and the like are preferred. Such tungsten compounds undesirably initiate cationic polymerization immediately, if it is added directly to ABH and ADHN. It is therefore preferable that they are previously suspended in an inert solvent such as, for example, benzene, toluene or chlorobenzene and solubilized by the addition of an alcoholic compound or a phenolic compound, and then a chelating agent or Lewis base is added to the tungsten compound in order to prevent undesirable polymerization. The additive may include acetylacetone, acetoacetic acid alkyl esters, tetrahydrofuran, benzonitrile and the like. Thus, the monomer solution containing the tungsten or other metathesis main catalyst compound (called "Solution A") is kept stable sufficient for practical use.

The activator components in the metathesis polymerization catalyst system include organic metal compounds such as alkylated products of metals of Group I–Group III in the Periodic Table, preferably, tetraalkyl tins, alkylaluminum compounds and alkylaluminum halide compounds including diethylaluminum chloride, ethylaluminum dichloride, trioctylaluminum, dioctylaluminum iodide, tetrabutyltin and the like. The organic metal compounds as the activator component are dissolved in a mixed monomer containing ABH or ADHN to form the other solution (called "Solution B").

According to the present invention, in principle, a polymer molded articles are produced by mixing Solution A and Solution B as described above. The polymerization reaction, however, starts to rapidly when the above-mentioned composition is used that the undesirable curing sometimes occurs before the composition is sufficiently flowed into the mold. In order to overcome the problem, it is preferable to use a reaction moderating agent.

As such moderators are used Lewis bases in general, particularly ethers, esters, nitriles and the like. Examples of the moderators include ethyl benzoate, butyl ether, diglyme, benzonitrile and the like. Such a moderator is used generally by adding it to the solution containing an organic metal compound activator (Solution B).

When a tungsten compound is used as the catalyst component, the ratio of the tungsten compound to the above-mentioned monomer is approximately 1000:1—approximately 15,000:1, and preferably about 2000:1 on molar basis. When an alkylaluminum compound is used as the activator component, ratio of the aluminum compound to the above-mentioned monomer is approximately 100:1—approximately 2000:1 and preferably around a ratio of approximately 200:1—approximately 500:1 on molar basis. The amount of the masking agent or the moderator as described above may be adjusted by experiments depending upon the amount of the catalyst system.

A variety of additives may be used practically in the present invention in order to improve or maintain characteristics of the molded articles. The additives include fillers, reinforcing agents, pigments, antioxidants, light stabilizers, macromolecular modifiers and the like. These additives must be added to the starting solutions, since they cannot be added after the solutions are polymerized to the solid molded polymer.

They may be added to either one or both of Solution A and Solution B. The additives must be ones being substantially unreactive with the highly reactive catalyst or activator component in the solution to avoid troubles as well as not inhibiting polymerization.

If such a reaction between the additive and the catalyst is unavoidable but does not proceed so rapidly, the additive can be mixed with the monomer to prepare a third solution, which is mixed with the first and/or second solutions just before pouring the mixture into a mold. When the additive is a solid filler, a reactive solution suspended with the filler can be used. Instead, the mold can be filled with the filler prior to the pouring of the reactive solutions into the mold.

The reinforcing agents and fillers can improve flexural modulus of the polymer. They include glass fibers, mica, carbon black, wollastonite and the like. The fillers whose surfaces are treated with silan couppling agent may preferably be employed.

The molded articles of the invention may preferably contain an antioxidant. Preferably, a phenol- or amine-antioxidant is added previously to the polymerizable solution. Examples of the antioxidants include 2,6-t-butyl-p-cresol, N,N'-diphenyl-p-phenylenediamine, tetrakis[methylene)3,5-di-t-butyl-4-hydroxycinnamate)]methane, methylene-4,4'-bis(3,5-di-t-butylphenol) and the like.

The polymer molded article of the invention may also contain other polymers, which are added to the monomer solution. Among polymers, elastomers are more preferable, since they increase the impact strength of the molded articles and are effective in controlling the viscosity of the solution. Examples of the elastomers include styrenebutadiene rubber, polybutadiene, butadiene-styrene triblock rubber, polyisoprene, butyl rubber, ethylene-propylene rubber, ethylene-propylene-diene terpolymers and the like.

As described above, the polymer molded articles of the invention are preferably prepared by simultaneously molding with polymerizing, i.e. by RIM process, in which two-part monomer solutions containing the catalyst and the activator respectively (that is, Solution A and Solution B) are rapidly mixed in the mixing head of a RIM instrument and the mixture is poured into a mold wherein it polymerizes and is molded.

In the RIM process, the mixture can be poured into the mold under relatively low pressure so that an inexpensive mold is usable. The temperature inside the mold increases rapidly by the heat of the polymerization reaction so that the polymerization reaction is completed in a short time. The molded articles of the invention can be removed easily from the mold without a releasing agent unlike the polyurethan-RIM process.

The surface of the molded articles of the invention has the polarity probably by the oxidized layer formed on the surface so that conventional coatings such as epoxy, polyurethane and the like adhere to the surface well.

The present invention provides a variety of molded articles which include large sized molded articles such as parts of various vehicles including automobiles, motorbikes, motorboats, snowmobiles, etc. and housings of electric and electronic instruments and the like.

The invention described herein is illustrated by the following examples. These examples do not limit the invention.

EXAMPLES 1-13 AND COMPARATIVE EXAMPLE 1

Commercially available dicyclopentadiene was purified by distillation under nitrogen and reduced pressure to produce purified dicyclopentadiene (DCP) with a freezing point of 33.4° C. The purity was determined by gas chromatography to be not less than 99%. Commercially available 5-ethylidenebicyclo[2.2.1]hept-2-ene (ENB) was distilled and purified to a purity of not less than 99.5% as measured by gas chromatography.

Mixed monomers of DCP with 2.5 mole %, 5 mole % and 10 mole % of ENB were prepared, respectively. Freezing point of each of the monomer mixtures solutions was measured. Results are shown in Table 1 below. As shown in the table, it was found that the freezing point decreased with the increased content of ENB in the solutions.

TABLE 1

| | Lowering of freezing point | | | |
|---|---|---|---|---|
| | Comparative Example 1 | Example 1 | Example 2 | Example 3 |
| Content of ENB (mole %) | 0 | 2.5 | 5 | 10 |
| Freezing point of the mixed monomer solution (°C.) | 33.4 | 25.0 | 15.5 | 5.8 |

[Preparation of solutions containing the catalyst]

20 g Of tungsten hexachloride was added to 70 ml of anhydrous toluene under nitrogen and then a solution consisting of 21 g of nonylphenol and 16 ml of toluene was added to prepare a catalyst solution containing 0.5M tungsten in terms of the metal content. The solution was purged with nitrogen overnight to remove hydrogen chloride gas formed by the reaction of tungsten hexachloride with nonylphenol. The resulting solution was used as a catalyst solution for polymerization.

With 10 ml of the above catalyst solution were mixed 1.0 ml of acetylacetone and 500 ml of DCP or a DCP/ENB mixture to prepare Solutions A containing 0.001M tungsten in terms of the metal content.

[Preparation of solutions containing activator]

0.18 g Of diethylaluminum chloride, 0.375 ml of isopropylether and 500 ml of DCP or a DCP/ENB mixture were mixed to prepare Solutions B containing 0.003M aluminum in terms of the metal content.

When the solutions A and B were kept at 25° C., the solutions A and B containing DCP alone as the monomer freezed. On the other hand, the solutions A and B containing both of DCP and ENB remained unfreezed.

Two mixed monomer solutions of Example 3 were kept in a refrigerator at 7° C. Both of them remained unfreezed. The above results show that the mixed monomer solutions of the invention containing DCP and ENB have lower freezing points and thus are easy in handling.

Further, Solutions A and Solutions B were prepared using mixed monomer solutions in which 20 mole % (Example 4), 30 mole % (Example 5), 40 mole % (Example 6), 48 mole % (Example 7), 50.5 mole % (Example 8), 60 mole % (Example 9), 70 mole % (Example 10), 80 mole % (Example 11), 90 mole % (Example 12) and 100 mole % (Example 13) of ENB were used with DCP, respectively.

Each of 10 ml of Solution A and 10 ml of Solution B was introduced into two syringes respectively kept at 25° C. and thoroughly purged with nitrogen. The solutions in each syringe were injected at a constant rate into a mold of a miniature-sized RIM instrument in which nozzle the solutions were mixed. Very strong molded plates consisting of the polymers were produced.

The time at which heat is rapidly generated in the system after mixing of the solutions and the temperature of the reaction mixture reaches at 100° C. (called "initiation time" hereinafter) and the maximum temperature attained in the system are indications to see whether or not polymerization was inhibited. The initiation time decreased and the maximum temperature increased with the increased content of ENB. This proves the high metathesis-polymerizability of ENB.

Amounts of residual monomers were measured by immersing about 1 g of the obtained polymer solids in 50 ml of toluene for more than 48 hrs. to extract the residual monomers, followed by GC measurement of the extracts. The results are summarized in Table 2, showing that the residual ENB was so small as to be almost undetectable so far as no more than 30% of ENB were copolymerized with DCP and that the residual DCP was smaller in all ranges than that in case of DCP homopolymers. Thus, such a small amount of the residual monomer reduced odor of the polymer, which was regarded as a serious disadvantage concerning DCP polymer articles.

In addition, the softening point which is an indication of the heat resistance of the polymer was measured by the TMA method as well as the degree of swelling in toluene which is an indication of the chemical resistance of the polymer. Results are shown in Table 2: The degree of swelling tends to increase with the increased content of ENB. This indicates that ENB portion does not generate the cross-linking but the linear polymer portion. The softening point of the molded plates by the TMA method increased after they were heated to 280° C. under $N_2$. Especially, the apparent softening point was not measurable in Examples 5 and 9. These results show that ENB brings the increase of the softening point by post-cure to the polymer.

TABLE 2

Reaction molding and molding polymers from ENB or mixture of ENB and DCP

| Example No. | 1 | 2 | 3 | 4 | 5 | 6 | 7 | 8 | 9 | 10 | 11 | 12 | 13 | Comparative Example 1 |
|---|---|---|---|---|---|---|---|---|---|---|---|---|---|---|
| ENB molar content (mole %) | 2.5 | 5 | 10 | 20 | 30 | 40 | 48 | 50.5 | 60 | 70 | 80 | 90 | 100 | 0 |
| Initial temp. when mixed (°C.) | 30 | 30 | 30 | 30 | 30 | 30 | 30 | 30 | 30 | 30 | 30 | 30 | 30 | 30 |
| Initiation time reaching 100° C. (sec.) | 35 | 31 | 26 | 31 | 23 | 23 | 22 | 21 | 21 | 20 | 19 | 19 | 18 | 35 |
| Max. temp. attained (°C.) | 194 | 196 | 196 | 194 | 206 | 206 | 204 | 200 | 184 | 205 | 222 | 181 | 215 | 192 |
| Amt. residual monomers ENB (%) | <0.03 | <0.03 | <0.03 | <0.03 | <0.03 | 0.62 | 0.60 | 0.57 | 0.61 | 0.59 | 0.59 | 0.63 | 1.93 | — |
| DCP (%) | 1.21 | 0.92 | 0.41 | 0.29 | 0.28 | 0.49 | 0.43 | 0.58 | 0.50 | 0.49 | 0.49 | 0.23 | — | 2.01 |
| TMA softening point *First | 98 | 96 | 97 | 92 | 90 | 87 | 85 | 83 | 80 | 76 | 70 | 76 | 72 | 92 |
| **Second | 123 | 121 | 120 | 107 | Not observed | 102 | 95 | 95 | Not observed | 110 | 106 | 107 | 93 | 113 |
| Degree of swelling*** | 1.58 | 1.64 | 1.75 | 1.97 | 2.10 | 2.93 | 3.70 | 5.29 | 6.43 | 8.73 | 12.720 | 10.72 | 14.43 | 1.52 |

*Measured by the needle penetration mode with heating the sample at the temperature increase of 10° C./min. under N₂ gas.
**Remeasured after the sample was heated up to 280° C. in the above manner.
***Samples were immersed in toluene for one day. Then, the weight ratio of the swelled samples to the originals was measured

EXAMPLE 14

[Preparation of a solution containing the catalyst]

20 g of tungsten hexachloride was added to 70 ml of anhydrous toluene under nitrogen and then a solution consisting of 21 g of nonylphenol and 16 ml of toluene was added to prepare a catalyst solution containing 0.5M tungsten in terms of the metal content. The solution was purged with nitrogen overnight to remove hydrogen chloride gas formed by the reaction of tungsten hexachloride with nonylphenol. The resulting solution was used as a catalyst solution of polymerization.

With 1.0 ml of the above catalyst solution were mixed 0.10 ml of acetylacetone and 9.0 ml of ENB to prepare a solution containing 0.05M tungsten in terms of metal content.

[Preparation of a solution containing the activator]

0.18 g Of diethylaluminum chloride, 0.375 ml of dipropyl ether and 9.5 ml of ENB were mixed to prepare a solution containing 0.15M aluminum in terms of the metal content.

A 100 ml glass vessel was charged with 50 ml of toluene (water content 5 ppm) and bubbled with nitrogen to thoroughly replace the gas in the vessel and the solution with nitrogen at 25° C. 2 ml Of the activator solution and 2 ml of the catalyst solution were added successively, and the mixture was vigorously stirred to produced a gelled mass.

phy. Commercially available dicyclopentadiene (DCP) was also subjected to distillation to give a purified material with the freezing point of 33.4° C.

A catalyst solution was prepared from tungsten hexachloride and nonylphenol in the same manner as in Examples 1–13.

10 ml Of the catalyst solution, 1.0 ml of acetylacetone and 500 ml of EDHN or EDHN/DCP mixture were mixed to prepare Solutions A containing 0.001M tungsten in terms of the metal content.

0.18 g Of diethylaluminum chloride, 0.375 ml of isopropyl ether and 500 ml of EDHN or EDHN/DCP mixture were mixed to prepare Solutions B containing 0.003M aluminum in terms of the metal content.

The ratio of DCP to EDHN of Solutions A and Solutions B was adjusted as shown in Table 3 below. Each of 10 ml of Solution A and 10 ml of Solution B was introduced into two syringes respectively kept at 25° C. and thoroughly purged with nitrogen. Molded plates were prepared by the RIM process in the same manner as in Examples 1–13. Very strong plates of the polymers were obtained.

The temperature at the time of mixing, the polymerization time, the TMA softening point and the degree of swelling of the polymers thus prepared are shown in Table 3.

The TMA softening point and the degree of swelling were measured in the same manner as in Examples 1–13.

TABLE 3

Reaction molding and molded polymers from EDHN or mixtures of EDHN and DCP

| | Example No. | | | | | | | | | | Comparative |
|---|---|---|---|---|---|---|---|---|---|---|---|
| | 15 | 16 | 17 | 18 | 19 | 20 | 21 | 22 | 23 | 24 | Example 1 |
| EDHN mole % | 100 | 90 | 80 | 70 | 60 | 50 | 40 | 30 | 20 | 10 | 0 |
| DCP mole % | 0 | 10 | 20 | 30 | 40 | 50 | 60 | 70 | 80 | 90 | 100 |
| Temperature at the time of mixing (°C.) | 30 | 30 | 30 | 30 | 30 | 30 | 30 | 30 | 30 | 30 | 30 |
| Initiation time (sec.)* | 40 | 38 | 35 | 36 | 46 | 40 | 34 | 57 | 61 | 43 | 35 |
| Max. temp. attained (°C.) | 201 | 200 | 206 | 197 | 200 | 204 | 201 | 197 | 198 | 196 | 192 |
| TMA Softening point | | | | | | | | | | | |
| First | 157 | 185 | 169 | 163 | 166 | 165 | 150 | 125 | 115 | 106 | 92 |
| Second | 166 | 198 | 179 | 172 | Not observed | 168 | 170 | Not observed | Not observed | Not observed | 113 |
| Degree of swelling | 2.97 | 2.84 | 2.66 | 2.67 | 2.62 | 2.47 | 2.45 | 2.40 | 2.05 | 1.70 | 1.52 |

*The time required until the temperature increases up to 100° C.

The gelled mass was redissolved by adding 50 ml of toluene. This indicates that the resultant polymers from ENB are not cross-linked but substantially linear by no participation of the pendant olefinic group in the metathesis reaction. The solution was cast on a glass plate and dried to give a tough, transparent strong film of ENB homopolymer by the metathesis polymerization.

The infrared absorption spectrum of the ENB homopolymer is shown in FIG. 1.

EXAMPLES 15–24

Commercially available 5-ethylidenebicyclo[2.2.1]-hept-2-ene (ENB) and dicyclopentadiene were subjected to the Diels-Alder reaction by heating at 170° C. in a pressure reaction vessel, and then purified by distillation under nitrogen to produce EDHN with a purity of not less than 99% as measured by gas chromatogra- The results in Table 3 show that the polymerization times of Examples 15–24 do not differ so much and thus show the high polymerizability for any of the examples.

The softening point measured by the TMA method increased dramatically with the increased content of EDHN. Especially, 90–50 mole % of EDHN copolymer with DCP (Examples 16–20) showed the higher softening point than EDHN homopolymer (Example 25). The softening point of the molded plates increased after they were heated to 280° C. under N$_2$. Especially, the apparent softening point was not measurable in Examples 19, 22, 23 and 24. These results show that the softening point increases by the post-cure. The degree of swelling tends to slightly decrease with the increased content of DCP.

EXAMPLE 25

[Preparation of a solution containing the catalyst]

20 g Of tungsten hexachloride was added to 70 ml of anhydrous toluene under nitrogen. Then, a solution consisting of 21 g of nonylphenol and 16 ml of toluene was added to prepare a catalyst solution containing 0.5M tungsten in terms of the metal content. The solution was purged with nitrogen overnight to remove hydrogen chloride gas formed by the reaction of nonylphenol with tungsten hexachloride.

1.0 ml Of the above catalyst solution was mixed with 0.10 ml of acetylacetone and 9.0 ml of EDHN to prepare a solution containing 0.05M tungsten in terms of the metal content.

[Preparation of a solution containing the activator]

0.18 g Of diethylaluminum chloride, 0.375 ml of isopropyl ether and 9.5 ml of EDHN were mixed to prepare a solution containing 0.15M aluminum in terms of the metal content. A 100 ml glass vessel was charged with 50 ml of toluene (water content 5 ppm) and bubbled with nitrogen to thoroughly replace the gas in the vessel and the solution with nitrogen at 25° C. 2 ml Of the activator solution and the catalyst solution were added successively, and the mixture was rapidly stirred to obtain a gelled mass.

The gelled mass was redissolved in an additional 50 ml of toluene, and the resultant homogeneous solution was cast on a glass plate and dried to produce a transparent strong film composed of EDHN homopolymer.

This indicates that the resultant polymers from EDHN is not cross-linked but substantially linear by no participation of the pendant olefinic group in the metathesis reaction.

Figure 2:
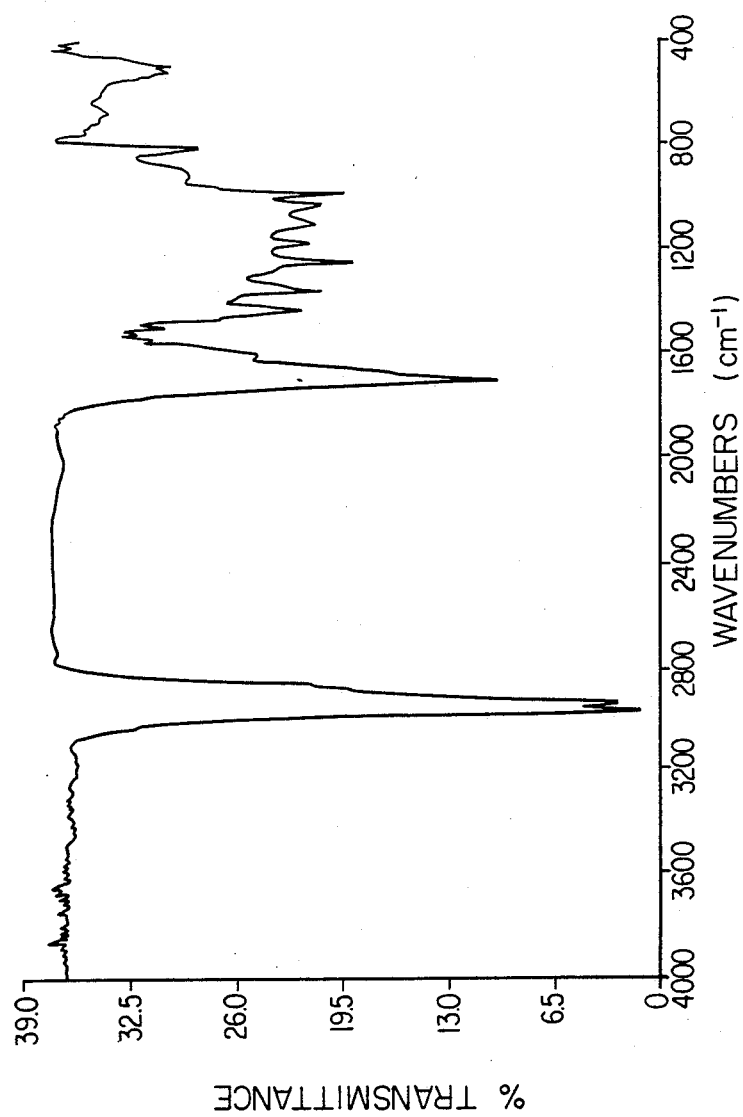
FIG. 2 shows the infrared absorption spectrum of 6-ethylidene-1,4,5,8-dimethano-1,4,4a,5,7,8,8a-hexahydronaphthalene (called EDHN hereinbelow).

Infrared absorption spectrum of the EDHN homopolymer is shown in FIG. 2.

EXAMPLE 26

Tricyclopentadiene, which was by-produced with EDHN when DCP and EBN were reacted at 170° C. in a pressure vessel, were distilled off with unreacted DCP and EDHN, and the resultant mixture composed of 30 wt % EDHN, 10 wt. % tricyclopentadiene and 60 wt. % DCP was reaction-molded just as were carried out in Examples 15-24. The obtained polymer showed a softening point of 142° C. by TMA.

EXAMPLE 27

From a rubberized monomer mixture composed of 28.3 wt. % of EDHN, 66.0 wt. % of DCP and 5.7 wt. % of styrene-butadiene rubber containing 5 wt. % of styrene, were prepared the reactive solution A and B.

The solutions A contained 0.001M of W catalyst component, which were formed as described in the previous Examples. The solutions B contained 0.003M of Al activator component composed of trioctylaluminum and dioctylaluminum iodide at 85:15 molar ratio and 0.003M of diglyme as a polymerization moderator.

These two reactive solutions were poured into the day-tanks of a reaction-injection-molding machine (a lance-type, mfd by Niigata Tekko Co., Ltd.) and polymer plates of 500 mm × 500 mm square with 3 mm thickness, were fabricated using the above solutions A and B by the reaction injection molding injected into a mold kept at 70° C. from 2 mm $\phi$ nozzle under 30 kg/cm² pressure. The resultant plates showed the good balance of stiffness, impact strength and heat-resistance as summarized in the following Table 5.

TABLE 5
Properties of the reaction-injection-molded plates from EDHN and DCP copolymer

| Item | Performance |
| --- | --- |
| Initiation time of the liquids | 73 sec. |
| Residual monomer | 3% |
| Heat distortion temperature(°C.) | 112° C. (18.5 kg/cm²) |
| Notched izod initial | |
| (23° C.) | 35 kgcm/cm |
| (0° C.) | 29 kgcm/cm |
| (−30° C.) | 19 kgcm/cm |
| after aging in air at 90° C. for 7 days | |
| (23° C.) | 20 kgcm/cm |
| Flexual Str.(23° C.) | 627 kg/cm² |
| Flexual Mod.(23° C.) | 17600 kg/cm² |

EXAMPLES 28-34

By Diels-Alder reaction of cyclopentadiene with alkyl-phenyl-ether, acrylonitrile, methylacrylate, methylmethacrylate, methylcyclopentadiene, styrene, 4-vinylpyridine, respectively, were obtained 5-phenoxymethylnorbornene (PMNB), 5-cyanonorbornene, 5-methoxycarbonylnorbornene (MCN), 5-methyl-5-methoxycarbonylnorbornene (MMCN), methyldicyclopentadiene (MDCP), 5-phenylnorbornene (PNB) and 5-(4-pyridyl)norbornene (PDN). Using the above monomers with ENB, EDHN and DCP, monomer mixtures having compositions as shown in the following Table 6 were formed and polymerized by the reaction molding method similarly as described in Examples 1-13 to result in very tough, cross-linked-polymer plates. Initial temperatures when mixed, initiation times, maximum temperatures attained and softening points measured by TMA were summarized in the same Table 6.

It is observed that the initiation times became longer when the monomers having polar groups such as nitrile, ester, ether and tert-amine were used. Longer initiation time can be expected to be suitable for large-sized molded articles.

TABLE 6

| Example No. | 28 | 29 | 30 | 31 | 32 | 33 | 34 |
| --- | --- | --- | --- | --- | --- | --- | --- |
| monomer composition (mole %) | EDHN 10 DCP 85 PMNB 5 | EDHN 10 DCP 85 CNB 5 | ENB 10 DCP 85 MCN 5 | ENB 10 DCP 85 MMCN 5 | ENB 10 DCP 85 MDCP 5 | ENB 10 DCP 85 PNB 5 | ENB 10 DCP 89 PDB 1 |
| Initial temp. (100° C.) (sec) | 44 | 41 | 54 | 49 | 31 | 33 | 70 |
| Max. temp. attained (°C.) | 175 | 181 | 178 | 179 | 187 | 185 | 155 |
| Softening temp. | | | | | | | |

| Example No. | 28 | 29 | 30 | 31 | 32 | 33 | 34 |
|---|---|---|---|---|---|---|---|
| by TMA (°C.) | 115 | 112 | 93 | 98 | 97 | 97 | 91 |

COMPARATIVE EXAMPLES 2-3

Commercially available VBH and MBH (Aldrich) were purified by distillation. The purified VBH and MBH showed more than 99% purity by GC measurement.

These monomers were polymerized just as mentioned in Example 3, respectively.

The initiation of the metathesis polymerization occured similarly and the maximum temperature was in excess of 170° C. But during the polymerization, volatile substances were evolved off vigorously from the reaction mixture and the resultant polymers were found to be soft and brittle with many voids. These polymerization behaviors were very different from those of EBN and EDHN mentioned in the previous Examples.

We claim:

1. A polymer which comprises at least one repeating unit having the formula selected from the group consisting of

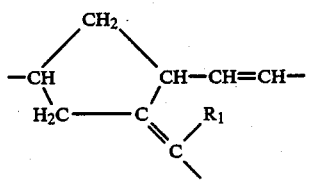
(I)

and

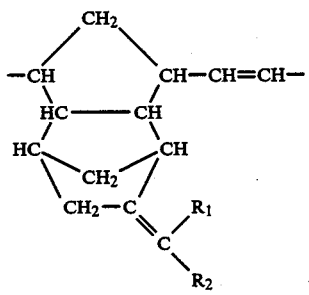
(II)

wherein $R_1$ and $R_2$ independently represent a hydrogen atom or an alkyl group containing up to three carbon atoms provided that both $R_1$ and $R_2$ are not hydrogen atoms.

2. A polymer of claim 1 wherein $R_1$ is a methyl group and $R_2$ is a hydrogen atom.

3. A polymer of claim 1 consisting essentially of the repeating unit having the formula (I).

4. A polymer of claim 1 consisting essentially of the repeating unit having the formula (II).

5. A polymer of claim 1 which further comprises at least one repeating unit derived from one or more metathesis polymerizable comonomers.

6. A polymer of claim 5 which comprises 98-50 mole % of the repeating unit of the formula (I) or (II) and 2-50 mole % of the at least one metathesis polymerizable comonomer repeating unit.

7. A polymer of claim 5 which comprises the repeating unit of the formula (I) and the repeating unit derived from dicyclopentadiene.

8. A polymer of claim 7 wherein $R_1$ is a methyl group and $R_2$ is a hydrogen atom.

9. A polymer of claim 5 which comprises the repeating unit of the formula (II) and the repeating unit derived from dicyclopentadiene.

10. A polymer of claim 9 wherein $R_1$ is a methyl group and $R_2$ is a hydrogen atom.

11. A polymer of claim 5 wherein the at least one metathesis polymerizable comonomer is a cycloalkene having at least one norbornene structure.

12. A polymer of claim 11 wherein said cycloalkene is selected from oligocyclopentadiene containing more than two cyclopentadiene moieties in a molecule and methylcyclopentadiene-cyclopentadiene codimer.

13. A polymer of claim 11 wherein the cycloalkene further comprises at least one member selected from the group consisting of a metathesis polymerizable cyclic olefin moiety and a polar group of an organic Lewis base.

14. A polymer of claim 11 wherein said cycloalkene is selected from a cycloalkene having one norbornene structure; a cycloalkene having one norbornene structure and one metathesis polymerizable sterically-distorted cyclopentene ring; and a cycloalkene having one norbornene structure and one or two polar groups selected from cyano, ester, ether, tert-amine and amide groups.

15. A polymer of claim 14 wherein said cycloalkene is selected from dicyclopentadiene, 5-phenylnorbornene, 5-cyanonorbornene, 5-alkoxycarbonylnorbornene, 5-methylalkoxycarbonylnorbornene and 5-pyridylnorbornene.

16. A polymer of claim 15 wherein said cycloalkene is dicyclopentadiene.

17. A polymer of claim 5 which comprises 1-50 mole % of the repeating unit of the formula (I) or (II) and 99-50 mole % of the at least one metathesis polymerizable comonomer repeating unit.

18. A polymer of claim 17 which comprises 5-50 mole % of the repeating unit of the formula (I) or (II) and 95-50 mole % of the metathesis polymerizable comonomer repeating unit.

19. A polymer of claim 18 which comprises 5-50 mole % of the repeating unit of the formula (II), 95-20 mole % of the repeating unit derived from dicyclopentadiene and 0-30 mole % of a repeating unit derived from another metathesis polymerizable monomer provided that the sum of said repeating units is 100 mole %.

20. A polymer of claim 19 wherein $R_1$ is a methyl group and $R_2$ is a hydrogen atom and said other monomer is tricyclopentadiene.

21. A polymer of claim 17 which comprises 1-10 mole % of the repeating unit of the formula (I) and 99-90 mole % of the metathesis polymerizable comonomer repeating unit.

22. A polymer of claim 21 which comprises 1-10 mole % of the repeating unit of the formula (I), 99-80 mole % of the repeating unit derived from dicyclopentadiene and 0-10 mole % of a repeating unit derived from another different metathesis polymerizable monomer.

23. A polymer of claim 22 wherein $R_1$ is a methyl group and $R_2$ is a hydrogen atom and said another monomer is oligocyclopentadiene.

24. A process for preparing the polymer of claim 1 which comprises metathesis polymerizing at least one compound having the formula (III)

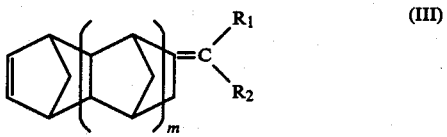
(III)

wherein m is 0 or 1 and $R_1$ and $R_2$ independently represent the same group as defined in the formulae (I) and (II), in the presence of a metathesis polymerization catalyst system.

25. A process of claim 24 wherein m is 0 and $R_1$ is a methyl group and $R_2$ is a hydrogen atom.

26. A process of claim 24 wherein m is 1 and $R_1$ is a methyl group and $R_2$ is a hydrogen atom.

27. A process of claim 24 which comprises polymerizing only the compound of the formula (III) wherein m is 0.

28. A process of claim 24 which comprises polymerizing only the compound of the formula (III) wherein m is 1.

29. A process of claim 24 wherein the metathesis polymerization catalyst system comprises a catalyst and an activator.

30. A process of claim 21 wherein the catalyst comprises a tungsten compound.

31. A process of claim 29 wherein the activator comprises an aluminum compound.

32. A process of claim 29 wherein a moderator is further used.

33. A process of claim 29 wherein the catalyst and the activator are supplied independently in separate liquids.

34. A process of claim 33 wherein the compound of the formula (III) is introduced into at least one of the liquids.

35. A process of claim 34 wherein each of the separate liquids contains the compound of the formula (III).

36. A process of preparing the polymer of claim 5 which comprises metathesis polymerizing a mixture of at least one compound having the formula (III)

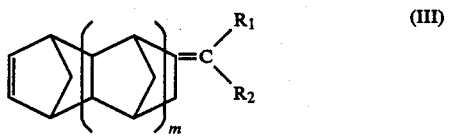
(III)

wherein m is 0 or 1 and $R_1$ and $R_2$ independently represent the same groups as defined in the formulae (I) and (II) with at least one other metathesis polymerizable comonomer in the presence of a metathesis polymerization catalyst system.

37. A process of claim 36 which comprises polymerizing 98-50 mole % of the compound of the formula (III) and 2-50 mole % of the at least one other metathesis polymerizable comonomer.

38. A process of claim 36 which comprises polymerizing 1-50 mole % of the compound of the formula (III) and 99-50 mole % of the at least one other metathesis polymerizable comonomer.

39. A process of claim 38 which comprises polymerizing 5-50 mole % of the compound of the formula (III) and 95-50 mole % of the other metathesis polymerizable comonomer.

40. A process of claim 38 which comprises polymerizing 1-10 mole % of the compound of the formula (III) wherein m is 0 and 99-90 mole % of the at least one other metathesis polymerizable comonomer.

41. A process of claim 40 which comprises polymerizing 1-10 mole % of the compound of the formula (III) wherein m is 0, 99-80 mole % of dicyclopentadiene and 0-10 mole % of at least one different other metathesis polymerizable comonomer.

42. A process of claim 41 wherein $R_1$ is a methyl group, $R_2$ is a hydrogen atom and said different metathesis polymerizable comonomer is oligocyclopentadiene.

43. A process of claim 39 which comprises polymerizing 5-50 mole % of the compound of the formula (III) wherein m is 1, 95-20 mole % of dicyclopentadiene and 0-30 mole % of at least one different metathesis polymerizable comonomer provided that the sum of all of said comonomer amounts is 100 mole %.

44. A process of claim 43 wherein $R_1$ is a methyl group, $R_2$ is a hydrogen atom, and said at least one different comonomer is oligocyclopentadiene.

45. A process of claim 36 which comprises polymerizing the compound of the formula (III) and dicyclopentadiene.

46. A process of claim 45 wherein m is 0, $R_1$ is a methyl group and $R_2$ is a hydrogen atom.

47. A process of claim 45 wherein m is 1, $R_1$ is a methyl group and $R_2$ is a hydrogen atom.

48. A process of claim 36 wherein said other metathesis polymerizable comonomer is a cycloalkene having at least one norbornene structure.

49. A process of claim 48 wherein the cycloalkene further contains at least one member selected from the group consisting of a metathesis polymerizable cycloolefin moiety and a polar group of an organic Lewis base.

50. A process of claim 48 wherein said cycloalkene is selected from oligocyclopentadiene containing more than two cyclopentadiene moieties per mole and methylcyclopentadiene-cyclopentadiene codimer.

51. A process of claim 48 wherein said cycloalkene is selected from a cycloalkene having one norbornene structure; a cycloalkene having one norbornene structure and one metathesis polymerizable sterically-distorted cyclopentene ring; and a cycloalkene having one norbornene structure and one or two polar groups selected from cyano, ester, ether and tert-amine groups.

52. A process of claim 51 wherein said cycloalkene is selected from dicyclopentadiene, 5-phenylnorbornene, 5-cyanonorbornene, 5-alkoxycarbonylnorbornene, 5-methylalkoxycarbonylnorbornene and 5-pyridylnorbornene.

53. A process of claim 52 wherein said cycloalkene is dicyclopentadiene.

54. A process of claim 36 wherein the metathesis polymerization catalyst system comprises a catalyst and an activator.

55. A process of claim 54 wherein the catalyst comprises a tungsten compound.

56. A process of claim 54 wherein the activator comprises an aluminum compound.

57. A process of claim 54 wherein a moderator is further used.

58. A process of claim 54 wherein the catalyst and the activator are supplied independently in separate liquids.

59. A process of claim 58 wherein said mixture is introduced into at least one of the liquids.

60. A process of claim 59 wherein each of said separate liquids contains said mixture.

61. A multi-part polymerizable composition comprising at least one compound of the formula (III)

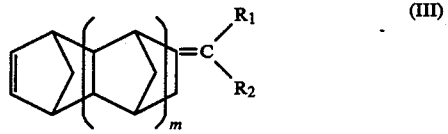

wherein m is 0 or 1 and $R_1$ and $R_2$ independently represent a hydrogen atom or an alkyl group containing up to three carbon atoms, provided that both $R_1$ and $R_2$ are not hydrogen atoms or a mixture of said compound with at least one other metathesis polymerizable comonomer; and a metathesis polymerization catalyst system comprising a catalyst and an activator, said catalyst and said activator being not present in the same part.

62. A composition of claim 61 comprising a first reactive solution containing said catalyst and said compound or said mixture and a second reactive solution containing said activator and said compound or said mixture.

63. A composition of claim 61 wherein m is 0, and $R_1$ is a methyl group and $R_2$ is a hydrogen atom.

64. A composition of claim 61 wherein m is 1 and $R_1$ is a methyl group and $R_2$ is a hydrogen atom.

65. A composition of claim 61 wherein the catalyst comprises a tungsten compound.

66. A composition of claim 61 wherein the activator comprises an aluminum compound.

67. A composition of claim 61 further containing a moderator.

68. A composition of claim 61 which comprises the compound of the formula (III) and the catalyst system.

69. A composition of claim 68 wherein m is 0.

70. A composition of claim 61 wherein m is 1.

71. A composition of claim 61 comprising a mixture of said compound and at least one other metathesis copolymerizable comonomer wherein said other metathesis polymerizable comonomer is a cycloalkene having at least one norbornene structure.

72. A composition of claim 71 wherein said cycloalkene is selected from oligocyclopentadiene containing more than two cyclopentadiene moieties per mole and methylcyclopentadiene-cyclopentadiene codimer.

73. A composition of claim 71 wherein the cycloalkene further contains at least one member selected from the group consisting of a metathesis polymerizable cycloolefin moiety and a polar group of an organic Lewis base.

74. A composition of claim 71 wherein said cycloalkene is selected from a cycloalkene having one norbornene structure; a cycloalkene having one norbornene structure and one metathesis polymerizable sterically-distorted cyclopentene ring; and a cycloalkene having one norbornene structure and one or two polar groups selected from cyano, ester, ether and tert-amine groups.

75. A composition of claim 71 which comprises the compound of the formula (III), dicyclopentadiene and the catalyst system.

76. A composition of claim 75 wherein m is 0, $R_1$ is a methyl group and $R_2$ is a hydrogen atom.

77. A composition of claim 75 wherein m is 1, $R_1$ is a methyl group and $R_2$ is a hydrogen atom.

78. A composition of claim 74 wherein said cycloalkene is selected from dicyclopentadiene, 5-phenylnorbornene, 5-cyanonorbornene, 5-alkoxycarbonylnorbornene, 5-methylalkoxycarbonylnorbornene and 5-pyridylnorbornene.

79. A composition of claim 78 wherein said cycloalkene is dicyclopentadiene.

80. A composition of claim 71 wherein the mixture comprises 98-50 mole % of the compound of the formula (III) and 2-50 mole % of the other metathesis polymerizable comonomer.

81. A composition of claim 80 wherein the mixture comprises 1-50 mole % of the compound of the formula (III) and 99-50 mole % of the other metathesis polymerizable comonomer.

82. A composition of claim 81 wherein the mixture comprises 5-50 mole % of the compound of the formula (III) and 95-50 mole % of the other metathesis polymerizable comonomer.

83. A composition of claim 81 wherein the mixture comprises 1-10 mole % of the compound of the formula (III) wherein m is 0 and 99-90 mole % of the other metathesis polymerizable comonomer.

84. A composition of claim 83 wherein the mixture comprises 99-80 mole % of dicyclopentadiene and 0-10 mole % of another different metathesis polymerizable comonomer.

85. A composition of claim 84 wherein $R_1$ is a methyl group, and $R_2$ is a hydrogen atom, and said other metathesis polymerizable comonomer is oligocyclopentadiene.

86. A composition of claim 82 wherein the mixture comprises 5-50 mole % of the compound of the formula (III) wherein m is 1, 95-20 mole % of dicyclopentadiene and 0-30 mole % of another different metathesis polymerizable comonomer provided that the sum of all of the comonomers is 100 mole %.

87. A composition of claim 86 wherein $R_1$ is a methyl group, and $R_2$ is hydrogen atom, said other comonomer is a oligocyclopentadiene.

* * * * *